(12) United States Patent
Oki

(10) Patent No.: US 11,498,045 B2
(45) Date of Patent: Nov. 15, 2022

(54) CATALYST DEVICE

(71) Applicant: TOYOTA JIDOSHA KABUSHIKI KAISHA, Aichi-ken (JP)

(72) Inventor: Toshinori Oki, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/467,456

(22) Filed: Sep. 7, 2021

(65) Prior Publication Data

US 2022/0088562 A1    Mar. 24, 2022

(30) Foreign Application Priority Data

Sep. 18, 2020 (JP) .............................. JP2020-157332

(51) Int. Cl.
| | | |
|---|---|---|
| *F01N 3/20* | (2006.01) | |
| *B01J 19/00* | (2006.01) | |
| *B01D 53/94* | (2006.01) | |
| *F01N 13/08* | (2010.01) | |

(52) U.S. Cl.
CPC ...... *B01J 19/0053* (2013.01); *B01D 53/9454* (2013.01); *F01N 3/2006* (2013.01); *F01N 13/08* (2013.01); *B01J 2219/0015* (2013.01); *B01J 2219/00135* (2013.01)

(58) Field of Classification Search
CPC ..... B01J 2219/00135; B01J 2219/0015; F01N 2240/16; F01N 2240/20; F01N 3/2853; F01N 13/18; F01N 3/2026
USPC ........................................................ 422/174
See application file for complete search history.

(56) References Cited

U.S. PATENT DOCUMENTS

| | | | |
|---|---|---|---|
| 4,002,433 A * | 1/1977 | Oser ..................... | F01N 3/2853 60/299 |
| 6,613,296 B1 * | 9/2003 | Myers ................ | B01D 53/9454 422/177 |
| 9,759,109 B2 * | 9/2017 | Mutsuda ............... | F01N 3/2013 |
| 2005/0036923 A1 * | 2/2005 | Brisbin ................. | F01N 3/2853 422/177 |
| 2013/0011305 A1 * | 1/2013 | Murata .................. | B01D 53/88 422/174 |
| 2013/0022513 A1 * | 1/2013 | Yoshioka .................. | F01N 3/24 422/174 |
| 2013/0183205 A1 | 7/2013 | Yoshioka et al. | |
| 2014/0216019 A1 * | 8/2014 | Yoshioka .............. | F01N 3/2013 60/300 |

FOREIGN PATENT DOCUMENTS

| | | |
|---|---|---|
| JP | 2015137552 | 7/2015 |
| JP | 2015148204 | 8/2015 |
| WO | 2013105246 A1 | 7/2013 |

* cited by examiner

*Primary Examiner* — Tom P Duong
(74) *Attorney, Agent, or Firm* — Hauptman Ham, LLP

(57) ABSTRACT

A catalyst device includes a heating element that generates heat when energized, a case that accommodates a catalyst support (heating element), an inflow pipe that draws exhaust gas into the case, and a connecting pipe that connects the inflow pipe and the case to each other. The case includes an end portion, which protrudes further in an upstream direction than an end face of the catalyst support. The inflow pipe is disposed inside the case. The catalyst device includes a triple-walled pipe structure, in which the connecting pipe overlaps with the end portion of the case and the inflow pipe in a covering manner.

6 Claims, 3 Drawing Sheets

CATALYST DEVICE

RELATED APPLICATIONS

The present application claims priority of Japanese Application Number 2020-157332 filed on Sep. 18, 2020, the disclosure of which is hereby incorporated by reference herein in its entirety.

BACKGROUND

1. Field

The present disclosure relates to a catalyst device including an electrically heated catalyst.

2. Description of Related Art

An electrically heated catalyst that is heated by energizing a heating element has been described. Such a catalyst is accommodated in and attached to a tubular case, while being electrically insulated from the case. Particulate matter or condensed water in exhaust gas may adhere to such an electrically heated catalyst. In this case, short circuits occur between the catalyst and the case, so that current also flows through the case. This reduces the heating efficiency of the catalyst.

International Publication No. 2013/105246 discloses a catalyst device that includes a double-walled pipe structure disposed on the upstream side of a catalyst in the direction in which exhaust gas flows. The double-walled pipe structure includes an inner pipe, which is located inside an outer pipe and has an end portion. The end portion of the inner pipe protrudes in an upstream direction from a position at which the inner pipe is attached to the catalyst. The inner pipe is formed by molding an insulating material. The catalyst device includes a case, which includes an inflow portion disposed upstream of the end portion of the inner pipe. The inflow portion is directed toward the end portion of the inner pipe and protrudes in a downstream direction. The catalyst device controls the flow of exhaust gas with the inner pipe and the inflow portion, so as to limit adhesion of particulate matter or condensed water between the case and the inner pipe. The catalyst device thus limits the occurrences of short circuits between the catalyst and the case.

However, even in the catalyst device disclosed in International Publication No. 2013/105246, particulate matter or condensed water may enter the space between the case and the inner pipe and adhere to the outer circumferential surface of the inner pipe. Accordingly, it is desired that adhesion of particulate matter and adhesion of condensed water be limited in order to limit the occurrences of short circuits between the catalyst and the case.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a catalyst device that is disposed in an exhaust passage is provided. The catalyst device includes a catalyst that purifies exhaust gas, a heating element that generates heat when energized and is configured to heat the catalyst, a case that is a pipe accommodating the catalyst and the heating element, a mat that is an insulating body for fixing the heating element in the case, a connecting pipe, and an inflow pipe. The connecting pipe is connected to an end portion of the case that is on an upstream side in a gas discharging direction. The gas discharging direction is a direction in which the exhaust gas flows in the exhaust passage. The inflow pipe is connected to an upstream end of the connecting pipe and has a radius smaller than a radius of the case. The end portion on the upstream side of the case protrudes further in an upstream direction than an upstream end of the heating element and is an electrically insulating portion. A portion in which the inflow pipe and the connecting pipe are connected to each other is a first connection portion. A portion in which the connecting pipe and the case are connected to each other is a second connection portion. The first connection portion includes a first joint portion in which the connecting pipe is joined to an outer circumferential surface of the inflow pipe, and a double-walled pipe structure that is located downstream of the first joint portion and in which the connecting pipe covers an insertion end portion of the inflow pipe. The connecting pipe and the inflow pipe overlap with each other such that the connecting pipe and the inflow pipe are separated from each other in a radial direction. The second connection portion includes a second joint portion in which the connecting pipe is joined to an outer circumferential surface of the case. The catalyst device further includes a triple-walled pipe structure between the first connection portion and the second connection portion. The case, the connecting pipe, and the inflow pipe overlap with one another in the triple-walled pipe structure such that the inflow pipe is disposed inside the case, the inflow pipe and the case are separated from each other in the radial direction, and the case and the connecting pipe are separated from each other in the radial direction.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A catalyst device 10 according to an embodiment will now be described with reference to FIGS. 1 to 3.

Figure 1:
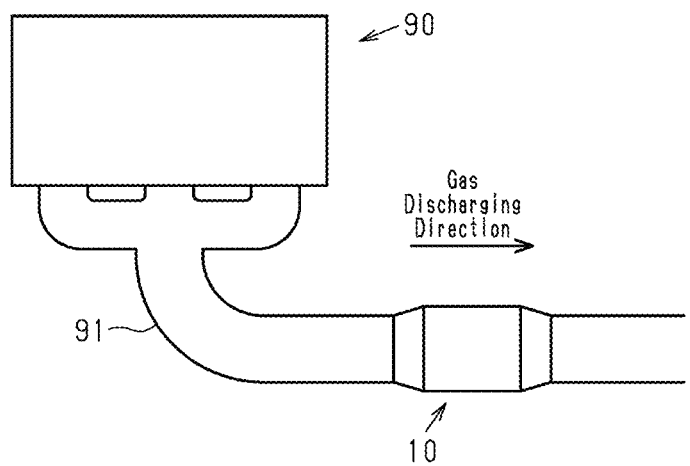
FIG. 1 is a schematic diagram showing an internal combustion engine equipped with a catalyst device according to an embodiment.

FIG. 1 shows the catalyst device 10 and an internal combustion engine 90 of a vehicle equipped with the catalyst device 10. One example of the internal combustion engine 90 is a gasoline engine, which uses gasoline as fuel. The internal combustion engine 90 may be a diesel engine, which uses diesel fuel. The internal combustion engine 90 includes an exhaust passage 91, through which exhaust gas discharged form combustion chambers flows. A gas discharging direction shown by an arrow in FIG. 1 indicates the direction in which exhaust gas discharged from the combustion chambers passes through the exhaust passage 91 and is discharged to the outside from an exhaust port. The catalyst device 10 is disposed in the exhaust passage 91. The catalyst device 10 is an electrically heated catalyst including a heating element that generates heat when energized.

Figure 2:
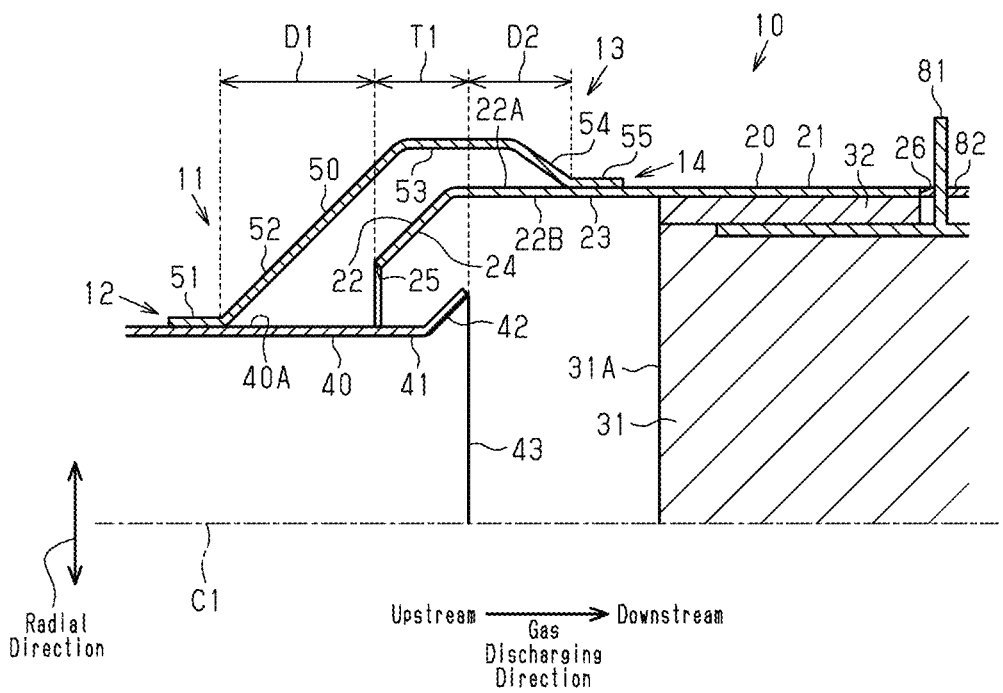
FIG. 2 is a cross-sectional view of the catalyst device shown in FIG. 1.
Figure 3:
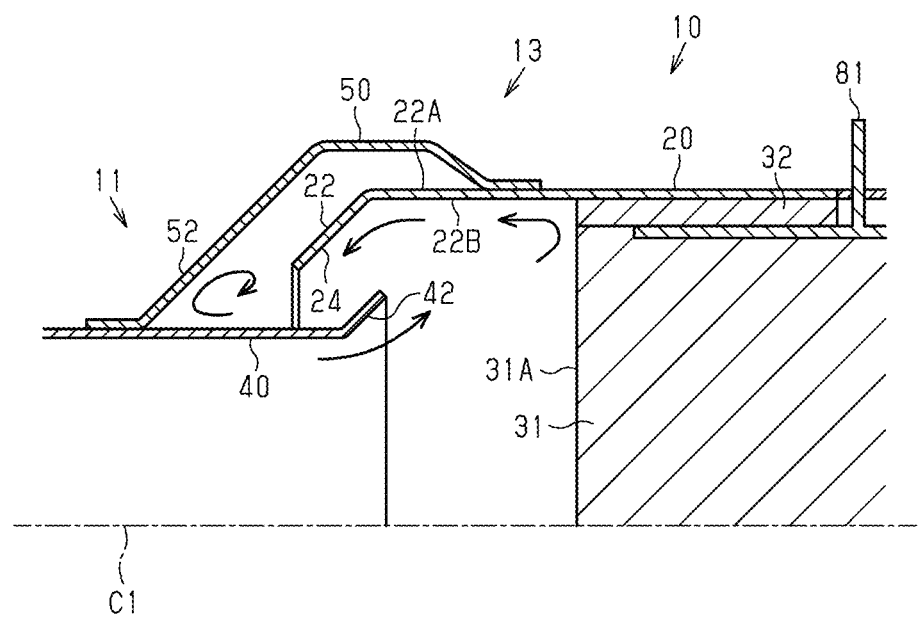
FIG. 3 a schematic diagram showing exhaust gas flowing through the catalyst device shown in FIG. 1.

FIG. 2 shows an axis C1, which is parallel with the central axis of the catalyst device 10. The axis C1 is parallel with the central axis of the exhaust passage 91. The catalyst device 10 has a shape that is symmetrical with respect to the axis C1. Like FIG. 1, FIG. 2 shows an arrow indicating a gas discharging direction.

As shown in FIG. 2, the catalyst device 10 includes a catalyst support 31, which supports a catalyst for purifying exhaust gas. The catalyst device 10 includes a case 20, which is a pipe accommodating the catalyst support 31. The catalyst device 10 includes a mat 32, which fixes the catalyst support 31 to an accommodation portion 21 of the case 20. The catalyst device 10 includes two electrodes 81 for energizing the catalyst support 31. FIG. 2 shows one of the two electrodes 81. The catalyst device 10 includes an inflow pipe 40, which draws exhaust gas flowing in the exhaust passage 91 into the case 20. The catalyst device 10 includes a connecting pipe 50, which connects the inflow pipe 40 and the case 20 to each other. Next, the structure of the upstream side in the catalyst device 10 will be described. The structure of the downstream side in the catalyst device 10 may be symmetrical with the structure of the upstream side. Alternatively, the structure of the downstream side may be a single-wall pipe structure with the case 20, which accommodates the catalyst support 31.

The catalyst support 31 has a columnar outer shape with its central axis agreeing with the axis C1. The outline of the cross section of the catalyst support 31 in a plane orthogonal to the axis C1 is circular. The catalyst support 31 may have a columnar shape with an elliptic cross-sectional outline or a polygonal prism-like shape with a polygonal cross-sectional outline.

The catalyst support 31 is a porous body. One example of the catalyst support 31 has a honeycomb structure in which channels extending in the gas discharging direction are defined. One example of the catalyst supported by the catalyst support 31 is a three-way catalyst. The catalyst may be an oxidation catalyst or a selective reduction catalyst.

The two electrodes 81 are connected to the catalyst support 31. When a voltage is applied across the electrodes 81, current flows through the catalyst support 31. When current flows through the catalyst support 31, the electrical resistance of the catalyst support 31 causes the catalyst support 31 to generate heat. That is, the catalyst support 31 is an object that generates heat according to the electrical resistance when energized. In other words, the catalyst support 31 is a heating element, which generates heat when energized. The catalyst support 31 is made of a ceramic containing silicon carbide. Another heating element may be employed that is made of a material different form that of the catalyst support 31. For example, a heating element to which the electrodes 81 are connected may be disposed in an upstream-side section of the catalyst support 31.

The mat 32 covers the side surface of the column of the catalyst support 31. The mat 32 is an insulating body having a low electric conductivity. The mat 32 is made of an inorganic fiber having alumina as a principal component. The mat 32 is held between the catalyst support 31 and the case 20. The outer radiuses of the catalyst support 31 and the mat 32 when the mat 32 is wrapped around the catalyst support 31 is greater than the inner radius of the accommodation portion 21 of the case 20. The mat 32 is compressed while being accommodated in the accommodation portion 21. The resilience of the mat 32 in a compressed state fixes the catalyst support 31 in the accommodation portion 21 of the case 20. Since the catalyst support 31 is covered with the mat 32, no current flows through the case 20 when the catalyst support 31 is energized. The mat 32 may be provided in any manner as long as it insulates the catalyst support 31 and the case 20 from each other. That is, the side surface of the catalyst support 31 does not necessarily need to be entirely covered with the mat 32.

The case 20 is a pipe formed by molding a metal such as stainless steel. The axis C1 is parallel with the central axis of the case 20. The case 20 includes the accommodation portion 21 and an end portion 22 located upstream of the accommodation portion 21. The catalyst support 31 is accommodated in the case 20. An end face of the catalyst support 31 on the upstream side is referred to as a catalyst upstream end 31A. The case 20 includes the end portion 22 at the upstream side of the catalyst upstream end 31A and the accommodation portion 21 at the downstream side of the catalyst upstream end 31A. The distance between the axis C1 and the inner circumferential surface of the accommodation portion 21 is defined as an inner radius of the accommodation portion 21. The inner radius of the accommodation portion 21 is constant over the entire length of the accommodation portion 21. The end portion 22 of the case 20 protrudes further in the upstream direction than the catalyst upstream end 31A. The surface of the end portion 22 of the case 20 is covered with an insulating material. The insulating material that covers the entire end portion 22 forms an insulating layer on the end portion 22. The end portion 22 of the case 20 is an insulating portion.

The accommodation portion 21 of the case 20 has electrode insertion holes 26, into which the electrodes 81 are inserted. The electrodes 81, which are connected to the catalyst support 31, protrude outside the case 20, via the electrode insertion holes 26. The electrode insertion holes 26 are closed by electrode holding portions 82. The electrode holding portions 82 fix the electrodes 81 inserted in the electrode insertion holes 26. The electrode holding portions 82 are insulating bodies having a low electric conductivity. Since the electrode holding portions 82 support the electrodes 81, current does not flow to the case 20.

The end portion 22 of the case 20 includes a decreasing radius portion 24, which is located at the upstream end of the case 20, and a constant radius portion 23, which is located between the decreasing radius portion 24 and the accommodation portion 21 to connect the decreasing radius portion 24 and the accommodation portion 21 to each other. The distance between the axis C1 and the inner circumferential surface of the constant radius portion 23 is defined as an inner radius of the constant radius portion 23. The inner radius of the constant radius portion 23 is constant over the entire length of the constant radius portion 23. The inner radius of the constant radius portion 23 is equal to the inner radius of the accommodation portion 21.

In the decreasing radius portion 24 in the end portion 22 of the case 20, the pipe is tapered such that the distance to the axis C1 decreases toward the upstream end. That is, the inner radius of the decreasing radius portion 24 decreases toward the upstream end. The inner radius of the case 20 is the smallest at the opening on the upstream side, that is, at a case opening 25 located at the upstream edge of the decreasing radius portion 24.

The thickness of the end portion 22 of the case 20 is constant over the entire length of the end portion 22, but may be uneven. For example, the thickness of the decreasing radius portion 24 may decrease toward the upstream end.

In the cross section of the catalyst device 10 shown in FIG. 2, the inner circumferential surface of the decreasing radius portion 24 is inclined in relation to the axis C1 such that the distance to the axis C1 decreases toward the upstream end. Likewise, the outer circumferential surface of the decreasing radius portion 24 is inclined in relation to the axis C1 such that the distance to the axis C1 decreases toward the upstream end. In the cross section shown in FIG. 2, the decreasing radius portion 24 may be curved such that the distance to the axis C1 decreases toward the upstream end.

The inflow pipe 40 is a pipe narrower than the case 20. The axis C1 is parallel with the central axis of the inflow pipe 40. The inflow pipe 40 is formed by molding a metal such as stainless steel. The inflow pipe 40 is inserted into the case 20 through the case opening 25. More specifically, the inflow pipe 40 includes an insertion end portion 41, which is the downstream end portion. The insertion end portion 41 is inserted into the end portion 22 of the case 20. The central axis of the inflow pipe 40 agrees with the central axis of the case 20.

The insertion end portion 41 of the inflow pipe 40 includes an increasing radius portion 42. In the increasing radius portion 42, the pipe gradually widens such that the distance to the axis C1 increases toward the downstream end. That is, the inner radius of the increasing radius portion 42 increases toward the downstream end. The inner radius of the inflow pipe 40 is largest at the opening on the downstream side, that is, at an inflow port 43 located at the downstream edge of the increasing radius portion 42.

The thickness of the increasing radius portion 42 of the inflow pipe 40 is constant over the entire length of the increasing radius portion 42, but may be uneven. For example, the thickness of the increasing radius portion 42 may decrease toward the upstream end.

In the cross section of the catalyst device 10 shown in FIG. 2, the inner circumferential surface of the increasing radius portion 42 is inclined in relation to the axis C1 such that the distance to the axis C1 increases toward the downstream end. Likewise, the outer circumferential surface of the increasing radius portion 42 is inclined in relation to the axis C1 such that the distance to the axis C1 increases toward the downstream end. In the cross section shown in FIG. 2, the increasing radius portion 42 may be curved such that the distance to the axis C1 increases toward the downstream end.

An outer circumferential surface 40A of the inflow pipe 40 and an inner circumferential surface 22B of the end portion 22 of the case 20 are separated from each other in the radial direction of the catalyst device 10. A space through which exhaust gas passes exists between the inflow pipe 40 and the case 20. The radial direction indicated by an arrow in FIG. 2 is the radial direction of the catalyst device 10. In the following description, the direction in which the distance from the axis C1 increases is defined as an outward direction, and the direction in which the distance from the axis C1 decreases is defined as an inward direction.

In the catalyst device 10, the increasing radius portion 42 and the decreasing radius portion 24 overlap with each other such that the decreasing radius portion 24 of the case 20 is located outward of the increasing radius portion 42 of the inflow pipe 40. The proximal end of the increasing radius portion 42, which is disposed on the side opposite to the inflow port 43, is disposed downstream of the case opening 25 of the case 20. The largest outer radius of the increasing radius portion 42 is smaller than the smallest inner radius of the decreasing radius portion 24.

In the cross section of the catalyst device 10 shown in FIG. 2, the outer circumferential surface of the increasing radius portion 42 and the inner circumferential surface of the decreasing radius portion 24 are parallel with each other. The outer circumferential surface of the increasing radius portion 42 does not necessarily need to be parallel with the inner circumferential surface of the decreasing radius portion 24 as long as the increasing radius portion 42 and the decreasing radius portion 24 are separated from each other in the radial direction. That is, the angle by which the outer circumferential surface of the increasing radius portion 42 is inclined in relation to the axis C1 can be changed. Also, the angle by which the inner circumferential surface of the decreasing radius portion 24 is inclined in relation to the axis C1 can be changed.

The connecting pipe 50 is arranged to cover the end portion 22 of the case 20 and the insertion end portion 41 of the inflow pipe 40. The axis C1 is parallel with the central axis of the connecting pipe 50. The connecting pipe 50 includes an upstream end 51, which is joined to the outer circumferential surface 40A of the inflow pipe 40. The catalyst device 10 includes a first joint portion 12, at which the upstream end 51 of the connecting pipe 50 and the inflow pipe 40 are joined to each other. The connecting pipe 50 includes a downstream end 55, which is joined to an outer circumferential surface 22A of the end portion 22 of the case 20. The catalyst device 10 includes a second joint portion 14, at which the downstream end 55 of the connecting pipe 50 and the case 20 are joined to each other. Since the connecting pipe 50 is joined to the inflow pipe 40 and the case 20, the space between the inflow pipe 40 and the case 20 is closed.

The connecting pipe 50 is formed by molding a metal such as stainless steel. The connecting pipe 50 may be divided into a segment including the upstream end 51, which is joined to the inflow pipe 40, and a segment including the downstream end 55, which is joined to the case 20. In this case, the two divided segments of the connecting pipe 50 are joined together to connect the inflow pipe 40 and the case 20 to each other. Alternatively, the connecting pipe 50 may be formed by a band-shaped member. In this case, the band-shaped member is wrapped around the end portion 22 of the case 20 and the insertion end portion 41 of the inflow pipe 40 in the circumferential direction, and the ends in the circumferential direction of the band-shaped member are stacked and joined together, so as to connect the inflow pipe 40 and the case 20 to each other.

The connecting pipe 50 includes an inclined portion 52, which extends from the upstream end 51. The distance from the inclined portion 52 to the axis C1 increases toward the downstream end. The inner circumferential surface of the inclined portion 52 is separated from the outer circumferential surface of the inflow pipe 40 in the radial direction. The inner circumferential surface of the inclined portion 52 is displaced outward from the outer circumferential surface of the inflow pipe 40. A space in which exhaust gas can flow exists between the inclined portion 52 and the inflow pipe 40. The inclined portion 52 is located in the same plane as the case opening 25, and is displaced outward from the case 20.

The connecting pipe 50 includes a terminal portion 54, which extends from the downstream end 55. The distance from the terminal portion 54 to the axis C1 increases toward the upstream end. The inner circumferential surface of the terminal portion 54 is separated from the outer circumferential surface of the case 20 in the radial direction. The inner circumferential surface of the terminal portion 54 is displaced outward from the outer circumferential surface of the case 20. A space in which exhaust gas can flow exists between the terminal portion 54 and the case 20.

The connecting pipe 50 includes a middle portion 53, which is located between the inclined portion 52 and the terminal portion 54 to connect the inclined portion 52 and the terminal portion 54 to each other. The inner radius of the middle portion 53 is constant over the entire length of the middle portion 53. The inner circumferential surface of the middle portion 53 is separated from the outer circumferential surface of the case 20 in the radial direction. The inner circumferential surface of the middle portion 53 is displaced outward from the outer circumferential surface of the case 20. A space in which exhaust gas can flow exists between the middle portion 53 and the case 20.

The boundary between the inclined portion 52 and the middle portion 53 in the connecting pipe 50 may be disposed downstream of the case opening 25. Alternatively, the boundary between the inclined portion 52 and the middle portion 53 may be disposed in the same plane as the case opening 25 or disposed upstream of the case opening 25.

The boundary between the middle portion 53 and the terminal portion 54 in the connecting pipe 50 may be disposed downstream of the inflow port 43. Alternatively, the boundary between the middle portion 53 and terminal portion 54 may be disposed in the same plane as the inflow port 43 or disposed upstream of the inflow port 43.

In the cross section of the catalyst device 10 shown in FIG. 2, the inner circumferential surface of the inclined portion 52 is inclined in relation to the axis C1 such that the distance to the axis C1 increases toward the downstream end. The inner circumferential surface of the terminal portion 54 is inclined in relation to the axis C1 such that the distance to the axis C1 increases toward the upstream end. The inner circumferential surface of the middle portion 53 is parallel with the axis C1.

The catalyst device 10 includes a double-walled pipe structure D1, in which a section of the connecting pipe 50 closer to the upstream end 51 overlaps with the inflow pipe 40 in a covering manner. The double-walled pipe structure D1 is formed between the first joint portion 12 and the case opening 25. The first joint portion 12 and the double-walled pipe structure D1 form a first connection portion 11, in which the inflow pipe 40 and the connecting pipe 50 are connected to each other.

The catalyst device 10 includes a double-walled pipe structure D2, in which a section of the connecting pipe 50 closer to the downstream end 55 overlaps with the case 20 in a covering manner. The double-walled pipe structure D2 is formed between the second joint portion 14 and the inflow port 43. The second joint portion 14 and the double-walled pipe structure D2 form a second connection portion 13, in which the case 20 and the connecting pipe 50 are connected to each other.

Further, the catalyst device 10 includes a triple-walled pipe structure T1, in which the connecting pipe 50 overlaps with the insertion end portion 41 and the end portion 22 of the case 20 in a covering manner. The triple-walled pipe structure T1 is located between the first connection portion 11 and the second connection portion 13.

In the triple-walled pipe structure T1, the case 20 and the connecting pipe 50 are disposed outward of and overlapped in the order with the inflow pipe 40. The space between the inflow pipe 40 and the case 20, which are included in the triple-walled pipe structure T1, is connected to the interior or the case 20 at the downstream end. The space between the inflow pipe 40 and the case 20, which are included in the triple-walled pipe structure T1, is connected to the space between the connecting pipe 50 and the inflow pipe 40, which are included in the double-walled pipe structure D1, at the upstream end. The space between the case 20 and the connecting pipe 50, which are included in the triple-walled pipe structure T1, is connected to the space between the connecting pipe 50 and the inflow pipe 40, which are included in the double-walled pipe structure D1, at the upstream end. The space between the case 20 and the connecting pipe 50, which are included in the triple-walled pipe structure T1, is connected to the space between the connecting pipe 50 and the inflow pipe 40, which are included in the double-walled pipe structure D2, at the downstream end.

As described above, the catalyst device 10 includes the double-walled pipe structure D1, the double-walled pipe structure D2, and the triple-walled pipe structure T1 in a section upstream of the catalyst support 31. The double-walled pipe structure D1, the double-walled pipe structure D2, and the triple-walled pipe structure T1 form a labyrinth structure into which exhaust gas can flow.

An operation of the present embodiment will now be described.

The flow of exhaust gas flowing from the inflow pipe 40 into the case 20 will be described with reference to FIG. 3. Arrows in FIG. 3 illustrate one example of the flow of exhaust gas.

In the catalyst device 10, the exhaust gas that flows from the inflow pipe 40 into the case 20 is easily diffused outward by the increasing radius portion 42 of the inflow pipe 40. The exhaust gas that has flowed into the case 20 is discharged after passing through the catalyst support 31. At this time, some of the exhaust gas flowing from the inflow pipe 40 into the case 20 changes its flowing direction when colliding with the catalyst upstream end 31A of the catalyst support 31. When colliding with the catalyst upstream end 31A, exhaust gas changes its flowing direction to an outward direction. Then, the exhaust gas flows toward the upstream side along the inner circumferential surface 22B of the end portion 22 of the case 20, as shown in FIG. 3. That is, the exhaust gas flows backward.

In the catalyst device 10, the decreasing radius portion 24 of the case 20 is disposed upstream of the catalyst upstream end 31A. Thus, the exhaust gas that has collided with the catalyst upstream end 31A and flowed backward may collide with the decreasing radius portion 24. Also, the increasing radius portion 42 of the inflow pipe 40 is disposed upstream of the catalyst upstream end 31A. Thus, the exhaust gas that has collided with the catalyst upstream end 31A and flowed backward collides with the increasing radius portion 42 in some cases. Collision of the exhaust gas with the decreasing radius portion 24 or the increasing radius portion 42 limits the backflow of the exhaust gas.

Some of the exhaust gas that has collided with the decreasing radius portion 24 flows inward along the inclination of the decreasing radius portion 24. The exhaust gas that has flowed inward flows through the space between the inflow pipe 40 and the case 20, and then flows into the space between the inflow pipe 40 and the connecting pipe 50 in the first connection portion 11.

The exhaust gas that has flowed into the space between the inflow pipe 40 and the connecting pipe 50 in the first connection portion 11 collides with the inclined portion 52. The exhaust gas that has collided with the inclined portion 52 seeks to change the flowing direction to a downstream direction. At this time, the exhaust gas changing its direction to the downstream direction is pushed back toward the upstream side by new exhaust gas flowing into the space between the inflow pipe 40 and the connecting pipe 50. This creates swirls of exhaust gas in the space between the inflow pipe 40 and the connecting pipe 50 in the first connection portion 11. Due to the created swirls of exhaust gas, exhaust gas is likely to stagnate in the space between the inflow pipe 40 and the connecting pipe 50 in the first connection portion 11.

The present embodiment has the following advantages.

(1) The catalyst device 10 prevents exhaust gas from reaching the space between case 20 and the connecting pipe 50 in the double-walled pipe structure D2 of the second connection portion 13 as long as the flow of the exhaust gas that has collided with the catalyst upstream end 31A does not reverse the flowing direction repeatedly. That is, the exhaust gas is unlikely to reach the space between case 20 and the connecting pipe 50 in the second connection portion 13. Thus, particulate matter (PM) and condensed water in exhaust gas are unlikely to collect in the space between the case 20 and the connecting pipe 50. This limits accumulation of PM on the outer circumferential surface 22A in the end portion 22 of the case 20.

Since the insulating layer on the end portion 22 is not easily covered with PM, paths through which current flows are not easily formed on the end portion 22. This limits the occurrences of short circuits between the catalyst support 31, which is a heating element, and the case 20.

(2) The larger the surface area of the end portion 22 of the case 20, which is an insulating portion that electrically insulates the catalyst support 31 and the case 20 from each other, the less likely that PM accumulated on the outer circumferential surface 22A of the end portion 22 will form paths through which current flows. Thus, the larger the surface area of the insulating portion, the less likely that short circuits will occur between the catalyst support 31 and the case 20. Also, the insulating portion is unlikely to be entirely covered with PM. Therefore, the insulating portion may be, for example, extended in order to further increase the surface area of the insulating portion. However, if the insulating portion, which is part of the case, is extended, the total length of the catalyst device is likely to be increased.

In this regard, the total length of the catalyst device 10 is not increased even if the end portion 22 of the case 20, which is disposed between the inflow pipe 40 and the connecting pipe 50, is extended. It is thus possible to prevent the total length of the catalyst device 10 from being increased, while ensuring a desirable length of the insulating portion, which electrically insulates the catalyst support 31 and the case 20 from each other.

(3) When high-temperature exhaust gas is blown on an insulating portion covered with an insulating layer, such as the end portion 22 of the case 20, a temperature increase may cause cracking of the insulating layer. Particularly, when high-temperature exhaust gas is blown on the edge of the end portion 22 of the case 20, the temperature of the edge is likely to increase abruptly.

In this regard, the edge of the end portion 22 of the case 20 is included in the triple-walled pipe structure T1 of the catalyst device 10. Thus, the exhaust gas that flows into the case 20 from the inflow pipe 40 is unlikely to collide with the edge of the end portion 22 of the case 20. Since high-temperature exhaust gas is not directly blown on the edge of the end portion 22, the temperature increase at the edge of the end portion 22 is limited. That is, the insulating layer is unlikely to crack, and paths through which current flows are unlikely to be formed in the insulating portion.

(4) In the catalyst device 10, the increasing radius portion 42 of the inflow pipe 40 may cause the exhaust gas that has collided with the catalyst upstream end 31A and flowed backward to collide with the increasing radius portion 42. Even when the exhaust gas that has flowed into the case 20 from the inflow pipe 40 changes its flowing direction to the upstream direction, collision of the exhaust gas with the increasing radius portion 42 hinders entry of the exhaust gas into the space between the inflow pipe 40 and the case 20. Since exhaust gas is unlikely to enter the space between the inflow pipe 40 and the case 20, exhaust gas is unlikely to reach the space between the case 20 and the connecting pipe 50. PM and condensed water are therefore unlikely to adhere to the outer circumferential surface 22A of the end portion 22. Accordingly, paths through which current flows are not easily formed in the end portion 22. This limits the occurrences of short circuits between the catalyst support 31, which is a heating element, and the case 20.

(5) The catalyst device 10 can create swirls of exhaust gas with the inclined portion 52 of the connecting pipe 50. Thus, exhaust gas is likely to stagnate in the space between the inflow pipe 40 and the connecting pipe 50 in the first connection portion 11, and does not easily reach the space between the case 20 and the connecting pipe 50 in the second connection portion 13. This limits accumulation of PM on the outer circumferential surface 22A of the end portion 22 of the case 20.

(6) In the catalyst device 10, the decreasing radius portion 24 of the end portion 22 of the case 20 causes the exhaust gas that has collided with the catalyst upstream end 31A and flowed backward to collide with the decreasing radius portion 24 in some cases. Even when the exhaust gas that has flowed into the case 20 from the inflow pipe 40 changes its flowing direction to the upstream direction, collision of the exhaust gas with the decreasing radius portion 24 hinders entry of the exhaust gas into the space between the inflow pipe 40 and the case 20. Since exhaust gas is unlikely to enter the space between the inflow pipe 40 and the case 20, exhaust gas is unlikely to reach the space between the case 20 and the connecting pipe 50. PM and condensed water are therefore unlikely to adhere to the outer circumferential surface 22A of the end portion 22. Accordingly, paths through which current flows are not easily formed in the end portion 22. This limits the occurrences of short circuits between the catalyst support 31, which is a heating element, and the case 20.

The above-described embodiment may be modified as follows. The above-described embodiment and the following modifications can be combined as long as the combined modifications remain technically consistent with each other.

The above-described embodiment illustrates the case 20, which includes the decreasing radius portion 24. However, a case without a decreasing radius portion may be employed.

Figure 4:
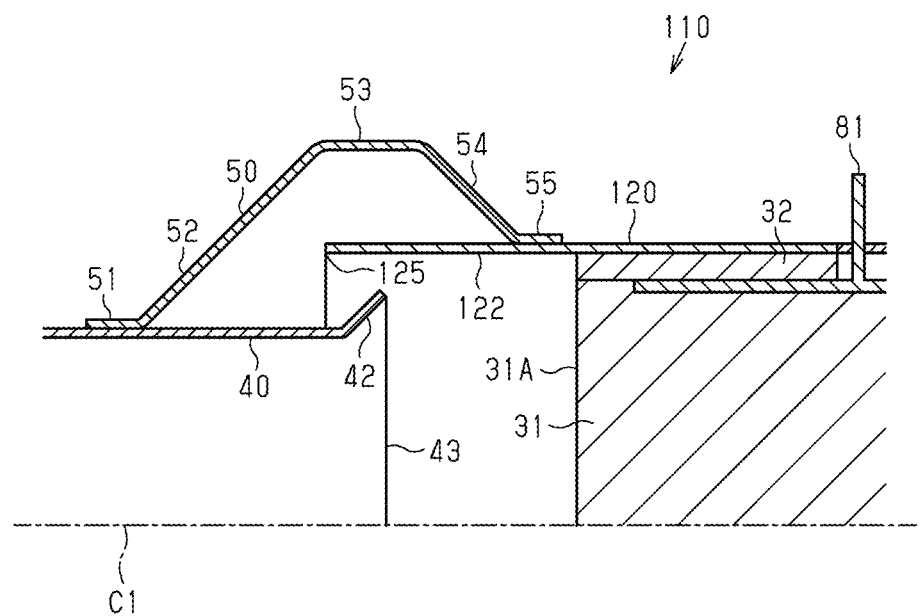
FIG. 4 is a cross-sectional view showing a catalyst device according to a modification.

For example, FIG. 4 shows a catalyst device 110 that includes a case 120, which is a pipe with a constant diameter. The same reference numerals are given to those components of the catalyst device 110 that are common to those in the catalyst device 10 shown in FIG. 2, and detailed explanations are omitted. The case 120 includes an end portion 122, which protrudes further in the upstream direction than the catalyst upstream end 31A. The inner radius of the end portion 122 is constant over the entire length of the end portion 122. The edge of the end portion 122, that is, a case opening 125, is disposed upstream of the inflow port 43 of the inflow pipe 40. The catalyst device 110 shown in FIG. 4 has the same advantages (1) to (5) as the above-described embodiment.

The above-described embodiment illustrates the inflow pipe 40, which includes the increasing radius portion 42. However, an inflow pipe without an increasing radius portion may be employed. For example, a pipe having a constant diameter may be employed as an inflow pipe. This modification has the same advantages as the advantages (1) to (3), (5), and (6) of the above-described embodiment.

In the above-described embodiment, the edge of the end portion 22 of the case 20 is included in the triple-walled pipe structure T1. Alternatively, the edge of a case does not necessarily need to be included in a triple-walled pipe structure as long as an inflow pipe, a case, and a connecting pipe form the triple-walled pipe structure.

Figure 5:
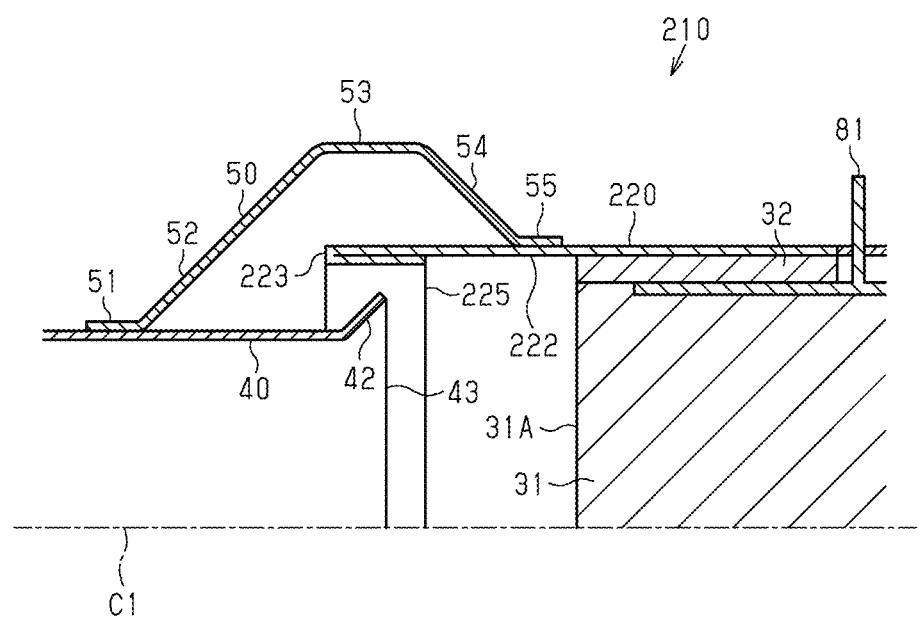
FIG. 5 is a cross-sectional view showing a catalyst device according to another modification.

For example, FIG. 5 shows a catalyst device 210 that includes a case 220. The case 220 has an upstream end portion folded in a downstream direction. The same reference numerals are given to those components of the catalyst device 210 that are common to those in the catalyst device 10 shown in FIG. 2, and detailed explanations are omitted. The case 220 includes an end portion 222, which protrudes further in the upstream direction than the catalyst upstream end 31A. The outer radius of the case 220 is constant over the entire length of the case 220. The end portion 222 of the case 220 has an edge 225 folded back into the case 220. The case 220 changes direction by 180 degrees at the edge 225. The end portion 222 includes a folded portion 223, which is located at the most upstream position. The wall of the case 220 overlaps with itself in the section from the folded portion 223 to the edge 225, forming a double-layer structure. The sections of the double layer structure of the case 220 may overlap with each other without a space in between or separated from each other in the radial direction. The folded portion 223 is disposed upstream of the inflow port 43 of the inflow pipe 40. The edge 225 is disposed downstream of the inflow port 43 of the inflow pipe 40. The catalyst device 210 shown in FIG. 5 has the same advantages (1), (2), (4), and (5) as the above-described embodiment.

Figure 6:
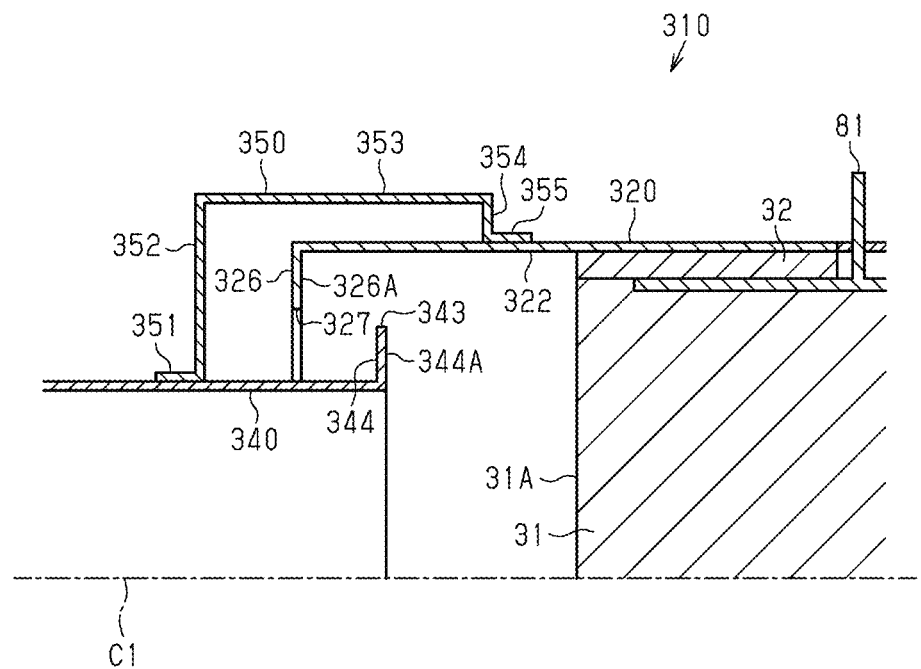
FIG. 6 is a cross-sectional view showing a catalyst device according to a further modification.

FIG. 6 shows a catalyst device 310 that includes a double-walled pipe structure and a triple-walled pipe structure. The same reference numerals are given to those components of the catalyst device 310 that are common to those in the catalyst device 10 shown in FIG. 2, and detailed explanations are omitted.

The catalyst device 310 includes a case 320. The case 320 includes an end portion 322, which protrudes further in the upstream direction than the catalyst upstream end 31A. An insulating layer is formed on the surface of the end portion 322. The end portion 322 includes a lid portion 326 having a hole 327. The lid portion 326 includes an inner wall surface 326A, which is opposed to the catalyst upstream end 31A. The inner wall surface 326A is orthogonal to the axis C1 in the cross section shown in FIG. 6.

The catalyst device 310 includes an inflow pipe 340. The inflow pipe 340 includes a flange portion 344, which is located at the downstream edge of the inflow pipe 340 and spreads outward. The flange portion 344 includes an opposed surface 344A, which is opposed to the catalyst upstream end 31A. The opposed surface 344A is orthogonal to the axis C1 in the cross section shown in FIG. 6. The inflow pipe 340 is inserted into the case 320. The distance from the axis C1 to an outer edge 343, which is the outermost section in the flange portion 344, is less than the radius of the hole 327.

The catalyst device 310 includes a connecting pipe 350. The connecting pipe 350 includes an upstream end 351, which is joined to the inflow pipe 340. The connecting pipe 350 includes a first wall 352, which spreads outward from the upstream end 351. The connecting pipe 350 includes a downstream end 355, which is joined to the case 320. The connecting pipe 350 includes a second wall 354, which spreads outward from the downstream end 355. The connecting pipe 350 includes a middle wall 353, which connects the first wall 352 and the second wall 354 to each other.

The inner surface of the first wall 352 is orthogonal to the axis C1 in the cross section shown in FIG. 6. The inner radius of the middle wall 353 is constant over the entire length of the middle wall 353. The inner surface of the second wall 354 is orthogonal to the axis C1 in the cross section shown in FIG. 6.

The catalyst device 310 includes a double-walled pipe structure in the range from the first wall 352 to the lid portion 326. The catalyst device 310 includes a triple-walled pipe structure in the range from the lid portion 326 to the flange portion 344. The catalyst device 310 includes another double-walled pipe structure in the range from the flange portion 344 to the second wall 354.

The catalyst device 310 limits passage of exhaust gas through the space between the inflow pipe 340 and the case 320 since the exhaust gas that has collided with the catalyst upstream end 31A and flowed backward collides with the inner wall surface 326A of the lid portion 326 or the opposed surface 344A of the flange portion 344. The catalyst device 310 causes the exhaust gas that has collided with the inner surface of the first wall 352 to stagnate, thereby limiting the flow of exhaust gas into the space between the case 320 and the connecting pipe 350. As in the case of the above-described embodiment, the catalyst device 310 limits accumulation of PM on the end portion 322 of the case 320. Accordingly, paths through which current flows are not easily formed in the end portion 322. This limits the occurrences of short circuits between the catalyst support 31, which is a heating element, and the case 320.

In the above-described embodiment, the inflow pipe 40 is disposed inside the case 20 such that the inflow port 43 of the inflow pipe 40 is located upstream of the second joint portion 14. However, the inflow port 43 may be disposed downstream of the second joint portion 14. Alternatively, the inflow port 43 and the second joint portion 14 may be disposed in a plane orthogonal to the axis C1. In these configurations, a double-walled pipe structure is formed in the range from the first joint portion 12 to the case opening 25. Further, a triple-walled pipe structure is formed in the range from the case opening 25 to the second joint portion 14. These configurations prevent exhaust gas from easily reaching the space between the case 20 and the connecting pipe 50 in the second connection portion 13, as in the case of the above-described embodiment The above-described embodiment illustrates the case 20, which is made of metal. However, a case formed by molding an insulating material may be employed. In a case in which a case made of an insulating material is employed, the end portion does not need to be covered with an insulating layer.

The above-described embodiment illustrates the connecting pipe 50, which connects inclined portion 52 and the terminal portion 54 with the middle portion 53. However, the middle portion 53 may be omitted, in order to connect the inclined portion 52 and the terminal portion 54 to each other.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A catalyst device that is disposed in an exhaust passage, the catalyst device comprising:
   a catalyst that purifies exhaust gas;
   a heating element that generates heat when energized and is configured to heat the catalyst;
   a case that is a pipe accommodating the catalyst and the heating element;
   a mat that is an insulating body for fixing the heating element in the case;
   a connecting pipe that is connected to an end portion of the case that is on an upstream side in a gas discharging direction, the gas discharging direction being a direction in which the exhaust gas flows in the exhaust passage; and
   an inflow pipe that is connected to an upstream end of the connecting pipe and has a radius smaller than a radius of the case, wherein
   the end portion on the upstream side of the case protrudes further in an upstream direction than an upstream end of the heating element and is an electrically insulating portion,
   a portion in which the inflow pipe and the connecting pipe are connected to each other is a first connection portion,
   a portion in which the connecting pipe and the case are connected to each other is a second connection portion,
   the first connection portion includes:
      a first joint portion in which the connecting pipe is joined to an outer circumferential surface of the inflow pipe; and
      a double-walled pipe structure that is located downstream of the first joint portion and in which the connecting pipe covers an insertion end portion of the inflow pipe, and the connecting pipe and the inflow pipe overlap with each other such that the connecting pipe and the inflow pipe are separated from each other in a radial direction,
   the second connection portion includes a second joint portion in which the connecting pipe is joined to an outer circumferential surface of the case,
   the catalyst device further comprises a triple-walled pipe structure between the first connection portion and the second connection portion,
   the case, the connecting pipe, and the inflow pipe overlap with one another in the triple-walled pipe structure such that
      the inflow pipe is disposed inside the case,
      the inflow pipe and the case are separated from each other in the radial direction, and
      the case and the connecting pipe are separated from each other in the radial direction, and
   an upstream end of the second joint portion is located downstream of a downstream end of the inflow pipe.

2. The catalyst device according to claim 1, wherein
   the end portion of the case is covered with an insulating layer in the insulating portion, and
   the end portion of the case includes an upstream edge that is included in the triple-walled pipe structure.

3. The catalyst device according to claim 1, wherein
   the inflow pipe includes an increasing radius portion, and
   in the increasing radius portion, a radius of an end portion of the inflow pipe that is inserted into the case increases in a downstream direction.

4. The catalyst device according to claim 1, wherein
   the connecting pipe includes an inclined portion, and
   in the inclined portion, a radius of the connecting pipe in the first connection portion decreases in an upstream direction.

5. The catalyst device according to claim 1, wherein
   the case includes a decreasing radius portion, and
   in the decreasing radius portion, a radius of the end portion of the case covering the inflow pipe decreases in an upstream direction.

6. The catalyst device according to claim 1, wherein
   the double-walled pipe structure is a first double-walled pipe structure, and
   the second connection portion further includes a second double-walled pipe structure which is located between the upstream end of the second joint portion and the downstream end of the inflow pipe and in which the connecting pipe covers the case, and the connecting pipe and the case overlap with each other such that the connecting pipe and the case are separated from each other in the radial direction.

* * * * *